(12) United States Patent
Zuiderveld

(10) Patent No.: US 7,362,329 B2
(45) Date of Patent: *Apr. 22, 2008

(54) OCCLUSION CULLING FOR OBJECT-ORDER VOLUME RENDERING

(75) Inventor: Karel Zuiderveld, Minnetonka, MN (US)

(73) Assignee: Vital Images, Inc., Minnetonka, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/559,300

(22) Filed: Nov. 13, 2006

(65) Prior Publication Data

US 2007/0091087 A1    Apr. 26, 2007

Related U.S. Application Data

(63) Continuation of application No. 10/155,892, filed on May 23, 2002, now Pat. No. 7,136,064.

(60) Provisional application No. 60/293,275, filed on May 23, 2001.

(51) Int. Cl.
    *G06T 15/00* (2006.01)
(52) U.S. Cl. .......... 345/424; 345/592
(58) Field of Classification Search ......... 345/422, 345/423, 424, 441, 592
    See application file for complete search history.

(56) References Cited

U.S. PATENT DOCUMENTS 4,625,289 A * 11/1986 Rockwood ............ 345/422
6,285,378 B1 * 9/2001 Duluk, Jr. ............. 345/441
6,664,961 B2   12/2003 Ray et al. ............. 345/424
7,136,064 B2 * 11/2006 Zuiderveld ........... 345/424

FOREIGN PATENT DOCUMENTS

| EP | 0368425 | 5/1990 |
|----|---------|--------|
| EP | 1001379 | 5/2000 |
| EP | 1089235 | 7/2002 |
| WO | WO-00/33257 | 6/2000 |

OTHER PUBLICATIONS

"File History from PAIR as of Nov. 5, 2007, for U.S. Appl. No. 10/155,892", 336 pgs.
"International Application No. PCT/US02/16438 Amendment filed Jul. 10, 2003", 3 pgs.
"International Application No. PCT/US02/16438 Amendment filed Aug. 21, 2003", 10 pgs.
"International Application No. PCT/US02/16438 Demand filed Dec. 20, 2002", 7 pgs.

(Continued)

*Primary Examiner*—Phu K. Nguyen
(74) *Attorney, Agent, or Firm*—Schwegman, Lundberg & Woessner, P.A.

(57) ABSTRACT

Computerized systems and methods provide occlusion culling for efficiently rendering a three dimensional image. The systems and methods calculate a set of occluder shields in a voxel dataset using a transparency value associated with each voxel of the dataset. Next, the occluder shields are applied to the dataset to identify regions of the voxel data that do not contribute to the final image. Finally, the voxel data set can be rendered, excluding regions that do not contribute to the final image.

20 Claims, 3 Drawing Sheets

OTHER PUBLICATIONS

"International Application No. PCT/US02/16438 International Preliminary Examination Report mailed Sep. 29, 2003", 13 pgs.

"International Application No. PCT/US02/16438 International Search Report mailed Jul. 23, 2002", 7 pgs.

"International Application No. PCT/US02/16438 Written Opinion mailed Jun. 10, 2003", 4 pgs.

Aref, Walid G., et al., "An Algorithm for Perspective Viewing of Objects Represented by Octrees", *Computer Graphics Forum*, 14(1), (1995),59-66.

Cabral, Brian , et al., "Accelerated volume rendering and tomographic reconstruction using texture mapping hardware", *Proceedings of the 1994 Symposium on Volume Visualization*, (1994),91-98.

Coorg, Satyan , et al., "Real-Time Occlusion Culling for Models with Large Occluders", *Proceedings of the ACM SIGGRAPH Symposium on Interactive 3D Graphics 1997*, (Apr. 1997),83-90.

Durand, Fredo , et al., "Conservative Visibility Preprocessing using Extended Projections", *Proceedings of the 27th Annual Conference on Computer Graphics and Interactive techniques*, (2000),239-248.

Hoff, Kenny , "A Faster Overlap Test for a Plane and a Bounding Box", http://www.cs.unc.edu/~hoff/research/vfculler/boxplane.html, Accessed through http://archive.org,(Jul. 8, 1996),2 p.

Hudson, T. , et al., "Accelerated occlusion culling using shadow frusta", *Proceedings of the Thirteenth Annual Symposium on Computational Geometry*, (1997),1-10.

Levoy, Marc , "Efficient ray tracing of volume data", *ACM Transactions on Graphics*, 9(3), (Jul. 1990),245-261.

Meißner, Michael , et al., "A practical evaluation of popular volume rendering algorithms", *Proceedings of the 2000 IEEE Symposium on Volume Visualization*, (2000),81-90.

Schaufler, Gernot , et al., "Conservative volumetric visibility with occluder fusion", *Proceedings of the 27th Annual Conference on Computer Graphics and Interactive Techniques*, (2000),229-238.

Zhang, Hansong , et al., "Visibility culling using hierarchical occlusion maps", *Proceedings of the 24th Annual Conference on Computer Graphics and Interactive Techniques*, (1997),77-88.

Zuiderveld, K. J., et al., "Acceleration of Ray-Casting Using 3D Distance Transforms", *Visualization in Biomedical Computing II, Proc. SPIE 1808*, (1992),324-335.

* cited by examiner

OCCLUSION CULLING FOR OBJECT-ORDER VOLUME RENDERING

RELATED APPLICATIONS

This application is a Continuation of U.S. application Ser. No. 10/155,892, filed on May 23, 2002 and issued as U.S. Pat. No. 7,136,064 on Nov. 14, 2006, which claims the benefit of U.S. Provisional Application No. 60/293,275, filed May 23, 2001. These applications are incorporated herein by reference.

FIELD

The present invention relates generally to computerized volume rendering, and more particularly to occlusion culling for volume rendering.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, 2002 Vital Images, Inc. All Rights Reserved.

BACKGROUND

Because of the increasingly fast processing power of modem-day computers, users have turned to computers to assist them in the examination and analysis of images of real-world data. For example, within the medical community, radiologists and other professionals who once examined x-rays hung on a light screen now use computers to examine images obtained via ultrasound, computed tomography (CT), magnetic resonance (MR), ultrasonography, positron emission tomography (PET), single photon emission computed tomography (SPECT), magnetic source imaging, and other imaging techniques. Countless other imaging techniques will no doubt arise as medical imaging technology evolves.

Each of the above-identified imaging procedures generates volume images, although each relies on a different technology to do so. Thus, CT requires an x-ray source to rapidly rotate around a patient to obtain up to hundreds of electronically stored pictures of the patient. Conversely, for example, MR requires that radio-frequency waves be emitted to cause hydrogen atoms in the body's water to move and release energy, which is then detected and translated into an image. Because each of these techniques penetrates the body of a patient to obtain data, and because the body is three-dimensional, this data represents a three-dimensional image, or volume. In particular, CT and MR both provide three-dimensional "slices" of the body, which can later be electronically reassembled.

Computer graphics images, such as medical images, have typically been modeled through the use of techniques such as surface rendering and other geometric-based techniques. Because of known deficiencies of such techniques, volume-rendering techniques have been developed as a more accurate way to render images based on real-world data. Volume-rendering takes a conceptually intuitive approach to rendering, by assuming that three-dimensional objects are composed of basic volumetric building blocks.

These volumetric building blocks are commonly referred to as voxels. Whereas, by contrast, the well known pixel is a picture element—i.e., a tiny two-dimensional sample of a digital image have a particular location in the plane of a picture defined by two coordinates—a voxel is a sample that exists within a three-dimensional grid, positioned at coordinates x, y, and z. The voxel has a "voxel value," as that value is obtained from real-world scientific or medical instruments. The voxel value may be measured in any of a number of different units, such as Hounsfield units, which are well known to those of ordinary skill within the art.

Furthermore, for a given voxel value, a transparency value, to indicate its opacity, as well as a color value, to indicate its color, may also be assigned (for example, in a particular tabling including such mappings). Such transparency and color values may be considered attribute values, in that they control various attributes (transparency, color, etc.) of the set of voxel data that makes up an image.

Using volume-rendering, any three-dimensional volume can be simply divided into a set of three-dimensional samples, or voxels. Thus, a volume containing an object of interest is dividable into small cubes, each of which contain some piece of the original object. This continuous volume representation is transformable into discrete elements by assigning to each cube a voxel value that characterizes some quality of the object as contained in that cube.

The object is thus summarized by a set of point samples, such that each voxel is associated with a single digitized point in the data set. As compared to mapping boundaries in the case of geometric-based surface-rendering, reconstructing a volume using volume-rendering requires much less effort and is more intuitively and conceptually clear. The original object is reconstructed by the stacking of voxels together in order, so that they accurately represent the original volume.

Although more simple on a conceptual level, and more accurate in providing an image of the data, volume-rendering is nevertheless still quite complex. In one method of voxel rendering, called image ordering or ray casting, the volume is positioned behind the picture plane, and a ray is projected perpendicularly from each pixel in the picture plane through the volume behind the pixel. As each ray penetrates the volume, it accumulates the properties of the voxels it passes through and adds them to the corresponding pixel. The properties accumulate more quickly or more slowly depending on the transparency of the voxels.

In another method, called object-order volume rendering, the voxel values are also combined to produce image pixels to display on a computer screen. Whereas image-order algorithms start from the image pixels and shoot rays into the volume, object-order algorithms generally start from the volume data and project that data onto the image plane.

A widely used object-order algorithm relies on dedicated graphics hardware to do the projection of the voxels in a parallel fashion. In one method, the volume data is copied into a 3D texture image. Then, slices perpendicular to the viewer are drawn; on each slice, the volumetric data is resampled. By drawing the slices in a back-to-front fashion and combining the results by a well-known technique called compositing, the final image will be generated. The image rendered in this method as well depends on the transparency of the voxels.

Thus while volume rendering provides significant visualization advantages, several problems remain. Although the speed of modem CPUs and graphics hardware is steadily increasing, the size of medical datasets is also rapidly growing. Modern multi-slice Computed Tomography (CT) scanners can generate datasets that contain more than a thousand slices; facilitating interactive manipulation and 3D visualization of these large datasets still poses tremendous challenges. Furthermore, in those systems employing texture mapping, with larger datasets the overhead associated with swapping data in and out and the limited-size texture memory severely degrades performance. As a result, there is a need in the art for the present invention.

SUMMARY

The above-mentioned shortcomings, disadvantages and problems are addressed by the present invention, which will be understood by reading and studying the following specification.

One aspect of the embodiments of the invention is a method for rendering a three dimensional image. The method calculates a set of occluder shields in a voxel dataset using a transparency value associated with each voxel of the dataset. Next, the occluder shields are applied to the dataset to identify regions of the voxel data that do not contribute to the final image. Finally, the voxel data set can be rendered, excluding regions that do not contribute to the final image.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
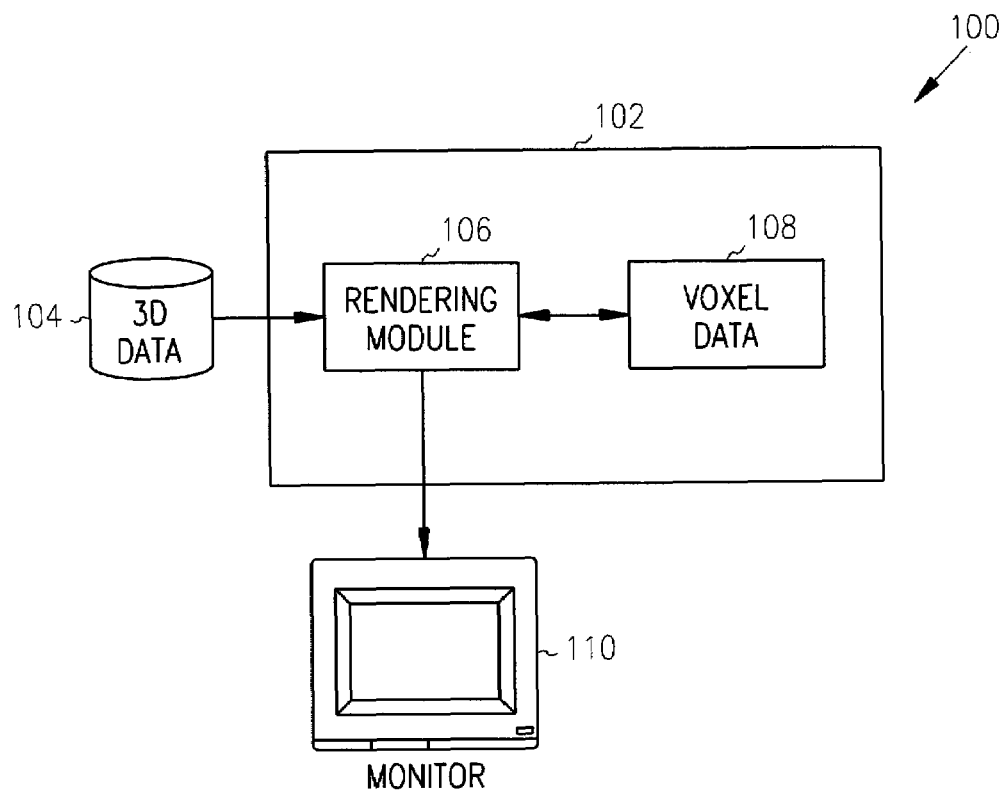
FIG. 1 is a block diagram of an operating environment in which different embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Some embodiments of the invention described below make use of concept referred to as effective transparency, which will now be described. As noted above, with volume rendering, each voxel is assigned a color and an opacity (conversely, a transparency); output images are created by performing volumetric compositing (blending). This can be done in either back-to-front or front-to-back fashion; with ray casting, front-to-back ray casting is most popular because it allows for a speedup technique called adaptive (or early) ray termination. Once a ray strikes an opaque object or has progressed a sufficient distance through a semitransparent object, the opacity accumulates to a level that the color of the ray stabilizes.

As an example, consider the opacity $\beta_P$ of a voxel at position $P_{x,y,z}$ of the volume; its transparency is defined by $\alpha_P = 1 - \beta_P$. When $\alpha_P$ is zero, the voxel is completely opaque. Now consider the total transparency encountered by the three axis-aligned trajectories through the point P and its six-connected neighborhood:

$$\alpha_{P,x1} = \alpha_{x-1,y,z} \alpha_{x,y,z} \alpha_{x+1,y,z}$$

$$\alpha_{P,y1} = \alpha_{x,y-1,z} \alpha_{x,y,z} \alpha_{x,y+1,z}$$

$$\alpha_{P,z1} = \alpha_{x,y,z-1} \alpha_{x,y,z} \alpha_{x,y,z+1}$$

The maximum transparency encountered along any axis-aligned trajectory through the voxel P is $$\alpha_{P,\max 1} = \max(\alpha_{P,x1}, \alpha_{P,y1}, \alpha_{P,z1})$$

$$= \alpha(x, y, z) \max(\alpha_{x-1,y,z} \alpha_{x+1,y,z}, \alpha_{x,y-1,z} \alpha_{x,y+1,z}, \alpha_{x,y,z-1} \alpha_{x+1,y,z+1})$$

Instead of calculating the transparencies along each of the three axis-aligned trajectories, some embodiments of the invention calculate an estimate for the highest possible transparency. As the following equation suggests, $$\max(ab, cd, ef) \Leftarrow \overset{2}{\max}(a, b, c, d, e, f)$$

this is possible by using the highest transparency of the six-connected neighbors.

This approach can be generalized to any neighborhood of P. Define $W^1_P$ as the first order neighborhood of P where $W^1_P$ is the 3×3×3 region around P. When $W^1_P$ is taken into account, the highest possible transparency along any path through P and $W^1_P$ is $$\alpha_{P,eff}1 = \alpha_P(\max \alpha_{W_n})^2 \qquad (1)$$

$\alpha_{P,eff\,1}$ is the first-order effective transparency and $\beta_{P,eff}1 = 1 - \alpha_{P,eff}1$ is the first-order effective opacity associated with P.

This approach can be extended naturally to neighborhoods of arbitrary size. Denoting the thickness of the neighborhood around the voxel as n, the nth order effective opacity can be calculated by $$\beta_{P,eff}n = 1 - \alpha_P(\max \alpha_{W_n})^{2n}$$

Table 1 relates several exemplary values for the minimum opacity in an exemplary neighborhood of order n with the corresponding effective opacities. For example, for a minimum opacity value of 0.3 in a third order neighborhood, the corresponding effective opacity is 0.917; this clearly demonstrates that rapid opacity accumulation can be accomplished with relatively low minimum opacity values.

TABLE 1

Effective opacities for orders n = 1 to 4 for several minimum opacity values

| $\beta_{min}$ | $\beta_{eff1}$ | $\beta_{eff2}$ | $\beta_{eff3}$ | $\beta_{eff4}$ |
| --- | --- | --- | --- | --- |
| 0 | 0 | 0 | 0 | 0 |
| 0.1 | 0.271 | 0.409 | 0.521 | 0.612 |
| 0.2 | 0.488 | 0.672 | 0.790 | 0.865 |
| 0.3 | 0.657 | 0.831 | 0.917 | 0.959 |
| 0.4 | 0.784 | 0.922 | 0.972 | 0.989 |
| 0.5 | 0.875 | 0.968 | 0.992 | 0.998 |
| 0.6 | 0.936 | 0.989 | 0.998 | 0.999 |
| 0.7 | 0.973 | 0.997 | 0.999 | 0.999 |
| 0.8 | 0.992 | 0.999 | 0.999 | 0.999 |
| 0.9 | 0.999 | 0.999 | 1 | 1 |

The concept of effective opacity provides a means for rapidly estimating the minimum opacity. Instead of having to perform extensive calculations to determine the actual opacity for a voxel position in a data set, a relatively simple determination of the minimum opacity in a neighborhood of voxels can be used to determine an estimated effective opacity. If the effective opacity of a voxel exceeds a user-defined threshold, it can be considered an occluding voxel; a large number of adjacent occluding voxels act as an occluder "shield". The rendering of voxel data sets after extracting occluding shields is discussed in further detail below.

Operating Environment

FIG. 1 is a block diagram of an operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

FIG. 1 illustrates a system 100 for rendering volume data. In some embodiments, system 100 includes a computer system 102 that includes a rendering module 106 that is capable of receiving input 3D data 104 and generating voxel data 108. The rendering module 106 processes voxel data 108 to display images on a monitor 110. In one embodiment of the invention, the rendering module is provided with the Vitrea™ 2 software available from Vital Images, Inc.

Computer system 102 may be any general purpose personal computing hardware and software. In one embodiment of the invention, computer system 102 is a personal computer having an Intel Pentium® based CPU running the Microsoft Windows XP® operating system. In an alternative embodiment of the invention, computer system 102 is a Silicon Graphics workstation running the IRIX® operating system. The invention is not limited to any particular computer hardware or operating system.

3D data 104 can be any type of 3D data. In some embodiments of the invention, 3D data 104 comprises medical image data such as that produced by computed tomography (CT), magnetic resonance (MR), ultrasonography, positron emission tomography (PET), single photon emission computed tomography (SPECT), magnetic source imaging, and other imaging techniques. In alternative embodiments, 3D data 104 can be data generated for a 3D gaming system. The invention is not limited to any particular type of 3D data.

Voxel data 108 is a voxel representation of data 104. In some embodiments of the invention, rendering module 106 uses the methods described below to extract occluders from voxel data 108 to be used in determining regions in the voxel data that will not be visible when displayed on monitor 110.

Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
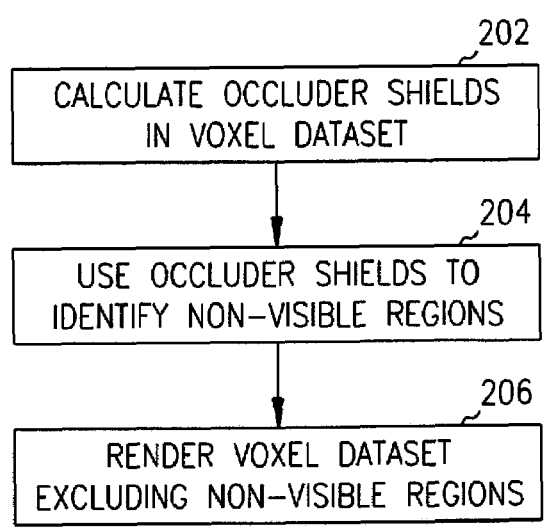
FIG. 2 is a flowchart illustrating a method for providing rendering a voxel dataset using occlusion culling according to an embodiment of the invention.
Figure 3:
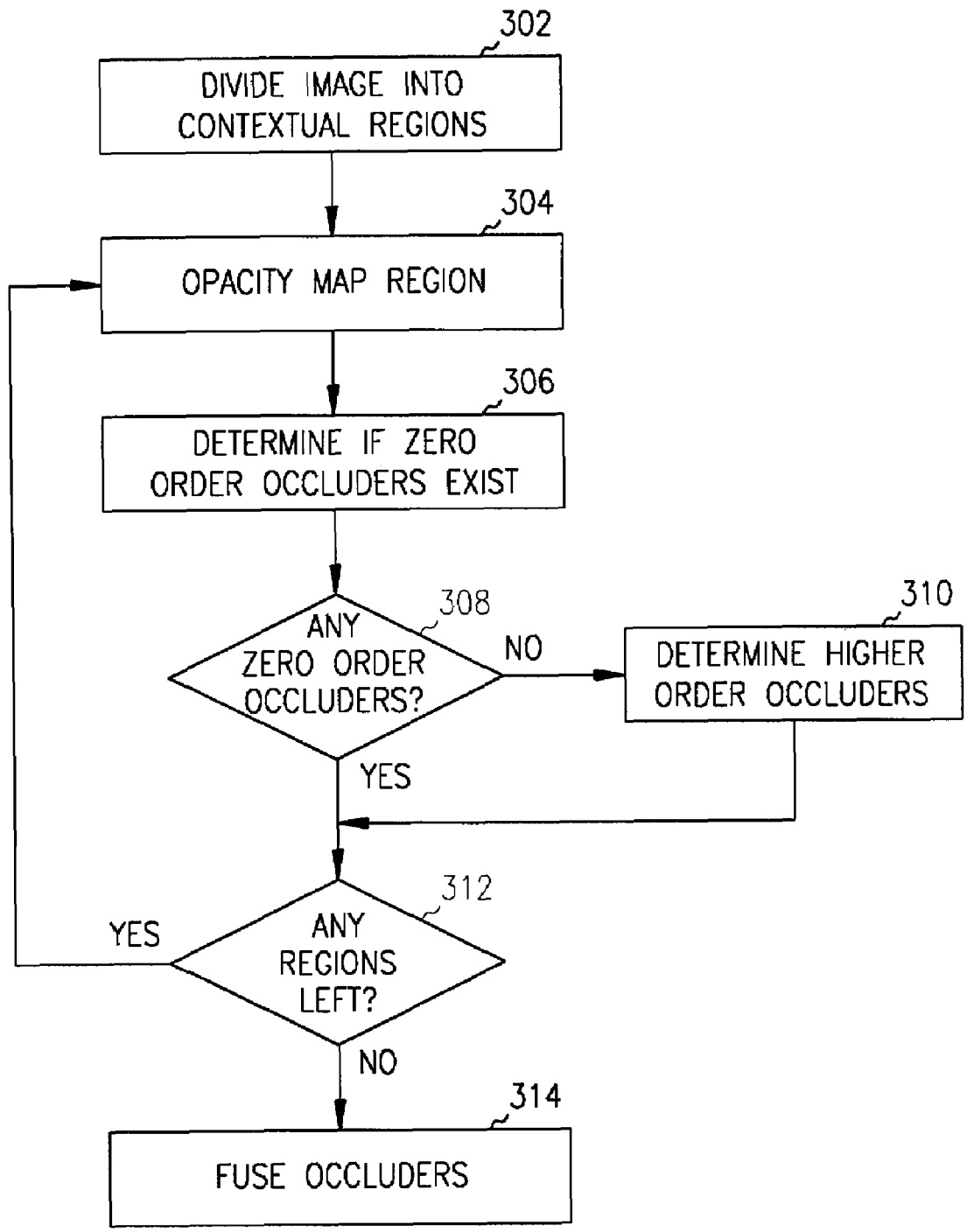
FIG. 3 is a flowchart further illustrating a method for performing occlusion culling on a voxel dataset according to an embodiment of the invention.

FIGS. 2-3 are flowcharts illustrating methods for performing occlusion culling on voxel data according to an embodiment of the invention. The methods to be performed by the operating environment constitutes computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 2-3 are inclusive of the acts required to be taken by an operating environment executing an exemplary embodiment of the invention.

FIG. 2 illustrates a method for rendering a voxel data set. A system executing the method, such as computer system 100, calculates a set of occluder shields in the voxel dataset using a transparency value associated with each voxel of the dataset (block 202). In general, if a transparency value exceeds a predetermined threshold, the voxel is opaque and can be considered an occluder. Further details regarding calculating occluder shields will be presented below in reference to FIG. 3.

The system then proceeds to apply the occluder shields to identify regions of the voxel data that do not contribute to the final image (block 204). In general, voxel data that is behind an occluding shield does not contribute to the final image.

Lastly, a system executing the method renders the voxel dataset, excluding those regions identified at block 204 that do not contribute to the final image (block 206).

FIG. 3 provides further details regarding a method used in some embodiments for calculating occluder shields in voxel data set. The method begins by dividing the voxel dataset into contextual regions (block 302). In some embodiments of the invention, the contextual regions have a dimension of fifteen voxels along each primary axis. However, the invention is not limited to any particular size for a contextual region. Dividing the voxel data set into contextual regions is desirable because an exhaustive search on all possible occluder shields in the dataset (having arbitrary direction and size) would generally be computationally too expensive.

Next, a system executing the method analyzes each contextual region to determine occluder shields in the contextual region. In some embodiments of the invention, only shields that coincide with a primary axis of a contextual region are considered; resulting in a maximum of x+y+z occluders per contextual region. This is desirable, because it speeds excluder extraction. In further embodiments of the invention, only those shields that span the entire contextual region are considered occluding shields; for example, shields along the x-axis are only considered when all y x z voxels are occluding. In these embodiments, it is desirable that contextual regions be relative small to increase the likelihood of finding shields that entirely fall within opaque regions. In one embodiment contextual regions of size $16^3$ are used (15 voxels+1 shared border voxel).

Calculation of occluding shields may require access to a significant amount of data. For example, for a contextual region size of $16^3$, finding 4th order occluders requires analysis of a $24^3$ subvolume, a more than threefold increase compared to the size of the original contextual region. In some embodiments, the system skips calculation of some higher order occluders; as a significant number of contextual regions fall completely inside (all voxels opaque, x+y+z 0-th order occluders) or completely outside (all voxels transparent, no occluders) objects of interests, most of the processing is done in regions that partially intersect with objects of interest.

Thus for each contextual region, the system first generates an opacity map for the contextual region (block 304). This step maps the voxel data corresponding to a x×y×z contextual region onto their transparency values. In some embodiments, this is done using a lookup table. In some embodiments, a 3 dimensional array of size x×y×z holds the voxel transparencies. In some embodiments, the opacity map comprises one byte per voxel and transparencies ranges from 0 (completely opaque) to 255 (completely transparent).

A system executing the method then proceeds to determine if a zero order occluder exist in the contextual region (block 306). To facilitate rapid determination of occluding shields, some embodiments of the invention use three vectors of size x, y, and z that contain the number of opaque voxels at each x, y, and z position; these vectors are initialized with zero. The system then traverses through all transparency values of the contextual region and, using simple comparison against a user-specified threshold, determines whether each voxel is an approximate occluder. In one embodiment, a transparency threshold of 51/255 (0.2) is used for zero order occluders, which corresponds to an opacity threshold of 0.8. For each occluding voxel, the entries of the three vectors corresponding with each of the voxel coordinates are incremented. In some embodiments, during the traversal, a simple test is performed to determine if any voxel that was not totally transparent is encountered.

After completing the traversal through the contextual region, the three arrays contain the total number of occluding voxels at each x, y, and z planes. Comparing these numbers with the number of voxels in each plane determines whether all voxels in each plane are occluding; if this is the case, the corresponding shield is an 0th order occluder. In alternative embodiments, a threshold value number of voxels in the plane can be used to determined if the shield is an occluder. One embodiment of the invention stores the occluders of a contextual region as four integers, one denoting the order of the occluder (which will be zero during this stage) whereas three integers define a bitmask that represents the occluders for each plane (each occluder is represented by a set bit).

In some embodiments, when all voxels in the contextual region are occluding, an x+y+z 0th order occluding shields is obtained and further processing is not required. Furthermore, in some embodiments, processing on a contextual region is stopped when all voxels are completely transparent; in this case, the entire contextual region can be marked as invisible and its contents never have to be processed during a rendering step.

In some embodiments, the system checks to see if a zero order occluder was found. (block 308). If so, the system proceeds to block 312, otherwise the contextual region contains non-transparent voxels and is not completely opaque.

If no zero order occluder was found in the contextual region, the system proceeds to determine higher order occluders (block 310). In some embodiments, the system performs opacity mapping at the borders of the contextual region. As described above, evaluation of higher order occluders requires calculation of the highest transparency values in a neighborhood around each voxel. In some embodiments, in order to determine the local maxima calculations, subsequent calculations are performed on a 3D array of size $(x+2N)\times(y+2N)\times(z+2N)$ where N is the maximum occlusion order. In some embodiments of the invention, N is three.

Except for the amount of voxel data read and handling of border pixels, this opacity mapping of borders is substantially identical to the step described above regarding $0^{th}$ order occluders. With contextual regions at the edge of the volume, the border values are initialized with the transparencies at the volume edge. When it is completed, the $(x+2N)\times(y+2N)\times(z+2N)$ array contains the transparencies of all voxels from the contextual region and a surrounding border of thickness N.

After opacity mapping the border of the contextual region, the system performs multiple passes over the contextual region, starting at order 1 and incrementing the order of each pass by one until the maximum order N is reached. In those embodiments of the invention employing effective transparency calculation, evaluation of equation (1) requires the calculation of the maximum transparency in the $3^3$ neighborhood. This step represents a simple morphological operation known in the art as 3D greylevel dilation. The $3^3$ kernel is typically separable which allows for a computationally very efficient implementation that relies on three subsequently applied 1D kernels of size 3. As ID dilation requires two comparisons for each voxel, 3D dilation can be accomplished in six comparisons per voxel; the 3D dilation of the contextual region processes $(x+2(N-1))\times(y+2(N-1))\times(z+2(N-1))$ voxels. Thus as an example, for a maximum occluder order of N=3 and a contextual region of $16^3$, 3D dilation requires 48K comparisons per iteration, which roughly corresponds to only 12 comparisons per voxel in the contextual region.

In some embodiments, the separable filters use different 3D arrays for source and destination; after each pass, source and destination arrays are switched. The temporary 3D arrays are typically about 10 KBytes each, which is generally small enough to keep all data processing local to the CPU's cache.

Further calculation for higher order occluders is similar to that outlined above for block 306; however some embodiments do not require the detection of fully transparent regions, and additionally, the used transparency threshold may be different. For example, in one embodiment, a transparency threshold of 100/255 ($\approx 0.39$) is used for higher order occluders, which corresponds to an opacity threshold of approximately 0.61.

The bitmasks resulting from the occluder calculations are compared to the ones that were found during the previous pass. Two cases are of particular interest:

1. Additional Occluders Found

When new occluders are found during a pass, the occlusion order of the contextual region is adjusted while the bits representing the new occluders are set.

With additional occluders found, it is not unlikely that another iteration might yield even more occluders; further analysis is therefore desirable. As the local minima from larger neighborhoods can be calculated by re-applying the greylevel dilation outlined previously, another pass through the contextual region is performed providing the maximum occlusion order has not been reached yet.

2. No Additional Occluders Found

Typically, the odds of finding new occluders decreases with each iteration. Thus in some embodiments of the invention, additional iterations at higher orders are not performed unless new occluders are found.

In some embodiments, processing of the contextual region is completed when the maximum number of occluding shields are found, the maximum number of iterations (i.e. the highest order) has been reached, or no new occluding shields were found during a new iteration.

The system then checks to see if any contextual regions remain to be processed (block 312). If so, the method returns to block 304 and processes the next region. The steps defined in blocks 304-312 are applied to each contextual region of the volume. In some embodiments, for each region this results in four integers that represent the highest occluder order and the position of the occluders represented as a simple bitmask.

After all contextual regions have been processed; the bitmasks and maximum occluder order are then used in some embodiments for fusion of the occluding shields (block 314). Fusion of occluders is desirable for at least two reasons. First, fusion results in occluders that are as large as possible. As the amount of volume data that is invisible (and therefore need not be processed) increases with the occluder area, it is desirable to determine large occluders.

Second, fusion results in fewer occluders. The actual occlusion culling step (determining which parts of the volume are occluded by a shield) tends to be computationally expensive. Therefore it is desirable to limit the number of occluders involved in the calculations.

In those embodiments where the occluders of each contextual region are specified by bitmasks, simple logical AND-ing the bitmasks of adjacent regions can determine whether occluders span multiple regions. Any bits that are set after the AND operation represents a fused occluder.

In this step, the method loops over all contextual regions of the volume (in x-y-z fashion). In some embodiments, the following steps are performed for each contextual region and axis:

1. Using the bitmasks from adjacent regions, the occluder is extended until the rectangular occluder spans the largest possible number of contextual regions. This is done in two phases; first, the occluder is expanded along "left-right" in a plane formed by the current primary axes, and all possible candidates are stored in a temporary list. Second, the candidate occluder rows are expanded along the "top-bottom" direction in the plane. The system keeps track of the occluder with the largest area that was encountered. After all candidates have been evaluated, the largest possible occluder is obtained in some embodiments. The search algorithm is generally exhaustive, but reasonably fast. However the invention is not limited to exhaustive search.

2. During the search for the largest occluder, we also determine the maximum occluder order encountered; this value represents the order of the fused occluder.

3. For each fused occluder, several properties can be stored; these include its order, its area, its axis, and the 3D coordinates of the two corners that span the occluder. The occluder can then be stored and assigned an integer identifier (ID).

4. Each contextual region contains can maintain a list of occluder IDs; this allows for an arbitrary number of occluders. As the fused occluder spans multiple regions, the same occluder ID is added to the occluder ID lists of all contextual regions that contain the fused occluder.

5. In some embodiments, the occluder fusion step is skipped when the occluder ID list of the contextual region already contains IDs that were added during processing of other contextual regions. This speeds up occluder fusion and reduces the number of occluder IDs stored at each region.

After fusing occluders in each of the primary axes, the system can use the generated occluders to determine which regions of the voxel data are invisible and need not be rendered.

Figure 4A:
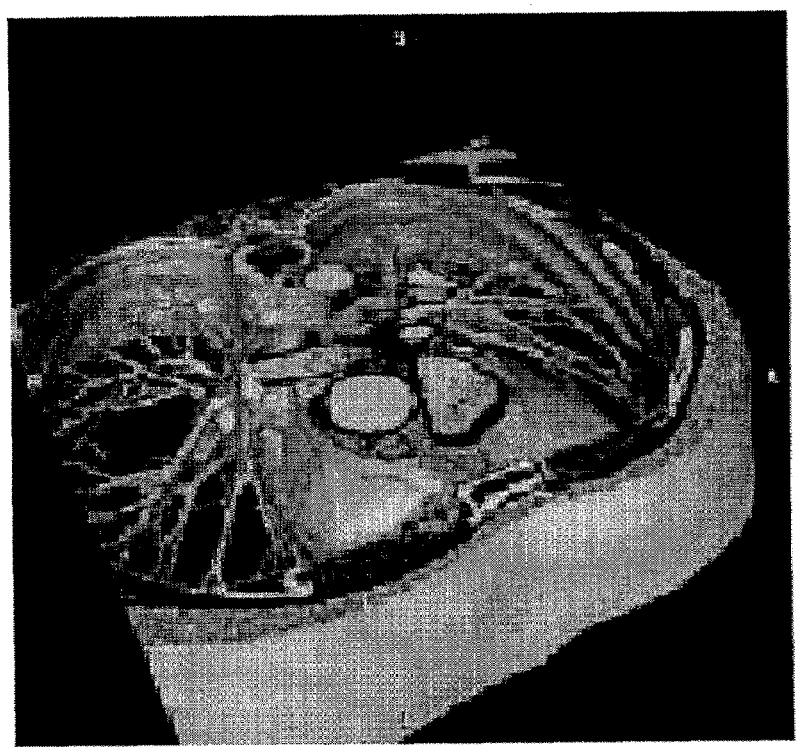
FIGS. 4A and 4B are diagrams illustrating a rendered voxel dataset and a graphical display of the occluders in the dataset as determined by embodiments of the invention.
Figure 4B:
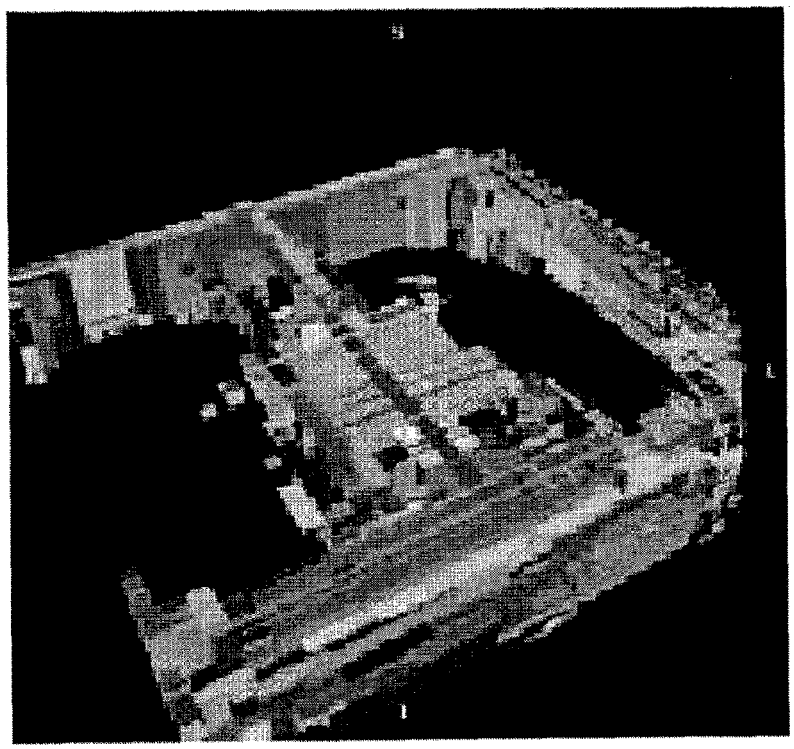

FIGS. 4A and 4B provides a graphical example of the results of the occluder selection and fusion process described above. FIG. 4A is a typical volume rendering for a medical image comprising a thorax data set. FIG. 4B shows the occluders extracted using the above-described systems and methods.

The sections above describe the various software methods in a system that performs occlusion culling in the volume rendering of image data. As those of skill in the art will appreciate, the software can be written in any of a number of programming languages known in the art, including but not limited to C/C++, Java, Visual Basic, Smalltalk, Pascal, Ada and similar programming languages. The invention is not limited to any particular programming language for implementation.

CONCLUSION

Systems and methods for performing occlusion culling for volume rendered images are disclosed. The systems and methods described provide advantages over previous systems by providing improved culling efficiency with low overhead. This efficiency and low overhead makes it possible to render complicated three dimensional images using general purpose personal computers, rather than specialized graphics workstations.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computerized method for rendering a three dimensional image, the method comprising:

calculating a set of occluding shields in a voxel dataset using a transparency value associated with respective voxels of the dataset, wherein the transparency value of a voxel indicates an opacity of that voxel, and wherein each occluding shield comprises a multidimensional group of neighboring occluding voxels constructed such that voxel data that is behind the occluding shield will not contribute to a final image, and wherein the calculating includes designating a voxel whose effective opacity exceeds a specified opacity threshold as an occluding voxel;

applying the occluding shields to identify the regions of the voxel data that are behind an occluding shield and therefore should not contribute to the final image; and rendering the voxel dataset, and excluding from said rendering the identified regions of the voxel data behind an occluding shield that do not contribute to the final image.

2. The method of claim 1, wherein the designating includes calculating the effective opacity for a voxel using an estimate of a maximum transparency that is computed using a transparency of another voxel in a neighborhood around the voxel.

3. The method of claim 1, comprising aligning the occluding shield with a plane formed by two primary axes.

4. The method of claim 1, wherein the calculating comprises:

dividing the voxel data into a plurality of contextual regions, each of the contextual regions comprising a plurality of voxels including respective transparency and position values; and indicating the presence of an occluding shield in a contextual region by setting a bit in a bitmask, the position of the bit in the bitmask indicating the position of the occluding shield in the contextual region.

5. The method of claim 1, wherein the calculating further includes fusing different occluding shields to form a fused occluding shield.

6. A device, comprising:

a memory; and a rendering module, operatively connected to the memory, wherein the rendering module is configured to:

calculate a set of occluding shields in a voxel dataset using a transparency value associated with respective voxels of the dataset, wherein the transparency value of a voxel indicates an opacity of that voxel, and wherein each occluding shield comprises a multidimensional group of neighboring occluding voxels constructed such that voxel data that is behind the occluding shield will not contribute to a final image, and further configured to designate a voxel whose effective opacity exceeds a specified opacity threshold as an occluding voxel;

apply the occluding shields to identify the regions of the voxel data that are behind an occluding shield and therefore should not contribute to the final image; and render the voxel dataset without including the identified regions of the voxel data behind an occluding shield that do not contribute to the final image.

7. The device of claim 6, wherein the rendering module is configured to calculate the effective opacity for a voxel using an estimate of a maximum transparency that is computed using a transparency of another voxel in a neighborhood around the voxel.

8. The device of claim 6, wherein the rendering module is configured to align the occluding shield with a plane formed by two primary axes.

9. The device of claim 6, wherein the rendering module is configured to divide the voxel data into a plurality of contextual regions comprising respective voxels having respective transparency and position values, and comprising a bitmask configured to indicate the presence of an occluding shield in a contextual region by setting a bit in the bitmask, the position of the bit in the bitmask indicating the position of the occluding shield in the contextual region.

10. The device of claim 6, wherein the rendering module is configured to fuse different occluding shields to form a fused occluding shield.

11. A system, comprising:

a database storing multidimensional data; and a device operatively connected to the database, wherein the device includes:

a memory; and a rendering module operatively connected to the memory, wherein the rendering module is configured to:

calculate a set of occluding shields in a voxel dataset using a transparency value associated with respective voxels of the dataset, wherein the transparency value of a voxel indicates an opacity of that voxel, and wherein each occluding shield comprises a multidimensional group of neighboring occluding voxels constructed such that voxel data that is behind the occluding shield will not contribute to a final image, and further configured to determine occluding voxels as respectively having an effective opacity that exceeds a specified opacity threshold;

apply the occluding shields to identify regions of the voxel data that are behind an occluding shield and therefore should not contribute to the final image; and render the voxel dataset without incorporating into the rendering the identified regions of the voxel data that do not contribute to the final image; and wherein the device receives the multidimensional data from the database and generates voxel data using the received multidimensional data.

12. The system of claim 11, the system comprising a display unit configured to be coupled to the device, wherein the display unit is configured to display one or more images of the rendered voxel dataset.

13. The system of claim 11, wherein the rendering module is configured to calculate the effective opacity for a voxel using an estimate of a maximum transparency that is computed using a transparency of another voxel in a neighborhood around the voxel.

14. The system of claim 11, wherein the rendering module is configured to divide the voxel data into a plurality of contextual regions comprising respective voxels comprising respective transparency and position values, and comprising a bitmask configured to indicate the presence of an occluding shield in a contextual region by setting a bit in the bitmask, the position of the bit in the bitmask indicating the position of the occluding shield in the contextual region.

15. The system of claim 11, wherein the rendering module is configured to fuse different occluding shields to form a fused occluding shield.

16. A computer-readable medium storing instructions that, when executed by a computer, cause the computer to:

calculate a set of occluding shields in a voxel dataset using transparency values associated with respective voxels of the dataset, wherein the transparency value of a voxel indicates an opacity of that voxel, and wherein each occluding shield comprises a multidimensional group of neighboring occluding voxels constructed such that voxel data that is behind the occluding shield will not contribute to a final image;

designate a voxel whose effective opacity exceeds a specified opacity threshold as an occluding voxel;

apply the occluding shields to identify the regions of the voxel data that are behind an occluding shield and therefore should not contribute to the final image; and render the voxel dataset, said rendering excluding use of the identified regions of the voxel data that do not contribute to the final image.

17. The medium of claim 16, storing instructions that, when executed by a computer, cause the computer to calculate the effective opacity for a voxel using an estimate of a maximum transparency computed using a transparency of another voxel in a neighborhood around the voxel.

18. The medium of claim 16, storing instructions that, when executed by a computer, cause the computer to align the occluding shield with a plane formed by two primary axes.

19. The medium of claim 16, storing instructions that, when executed by a computer, cause the computer to divide the voxel data into contextual regions respectively comprising voxels respectively comprising transparency and position values, wherein the presence of an occluding shield in a contextual region is indicated by setting a bit in a bitmask, the position of the bit in the bitmask indicating the position of the occluding shield in the contextual region.

20. The medium of claim 16, storing instructions that, when executed by a computer, cause the computer to fuse different occluding shields to form a fused occluding shield.

* * * * *